Sept. 19, 1939.  G. W. BARBER  2,173,293
INSECTICIDAL FUMIGATION OF GROWING CORN
Filed Feb. 28, 1938
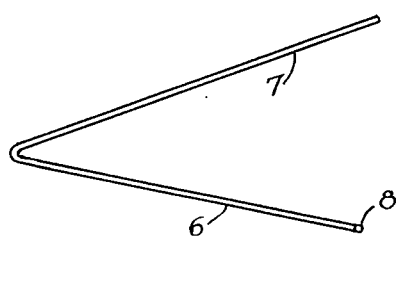
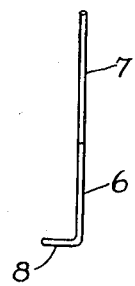
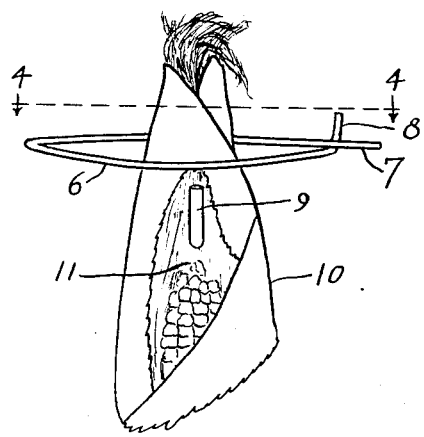
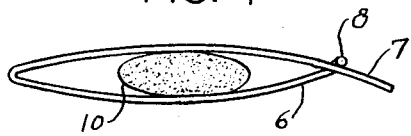
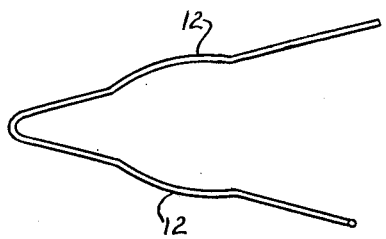
INVENTOR
GEORGE W. BARBER
BY
ATTORNEYS Patented Sept. 19, 1939

2,173,293

UNITED STATES PATENT OFFICE

2,173,293

INSECTICIDAL FUMIGATION OF GROWING CORN

George W. Barber, New Haven, Conn., dedicated to the free use of the People of the United States of America Application February 28, 1938, Serial No. 193,018

2 Claims. (Cl. 47—58)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people of the United States of America to take effect on the granting of a patent to me.

This invention relates to an improvement in method of protecting corn ears against caterpillars of Heliothis (Chloridea) obsoleta by fumigation and is equally effective against any other insect which feeds within corn ears.

The young larvae of Heliothis (Chloridea) obsoleta begin their feeding among the internal silk threads of the corn ear soon after silks are exposed exteriorly. These young larvae cannot be reached satisfactorily by sprays or dusts which are familiarly used in insect control. Especially in sweet corn ears the young larvae work their way interiorly to the cob so easily and quickly that no way of protecting the ears against them has been known heretofore which could be applied economically by growers, as a result of which it never has been possible to grow sweet corn in the southern states where the insect is annually abundant, and, due to the increasing prevalence of the insect in states farther north, serious losses have been sustained by growers of sweet corn because no feasible or sure way of protecting ears has been known heretofore.

The object of this invention is to make available a cheaper and more easily applied method of protecting corn ears than has been available heretofore, which will make it possible for growers of corn located anywhere to protect ears against ravages, more especially of caterpillars of Heliothis (Chloridea) obsoleta, but also of any other insect which feeds interiorly within corn ears.

One advantage of this invention is that a single application of the method of the invention per corn ear is sufficient to protect this ear until the time of roasting ear harvest.

Another advantage is that the method of the invention can be applied to ears during any weather, and no weather conditions affect the efficiency of the treatment.

Still another advantage is that the invention can be easily and quickly applied by anyone, and it entails no technical knowledge or skill for successful use.

A further advantage is the low cost of materials and the simplicity of the preparation of materials used.

A still further advantage is that the method of the invention frees corn ears of infestation by caterpillars of Heliothis (Chloridea) obsoleta, and keeps the ears free of infestation, no matter when the caterpillars enter or seek to enter the ears.

A still further advantage is that treatment of ears by the method of the invention produces the most desirable results, not only undamaged, but caterpillar-free corn ears at harvest.

A still further advantage is that no danger of injury to the consumer of roasting ears treated by the method of the invention seems possible.

A still further advantage is that when treated by the method of the invention corn ears are not injured or changed in appearance in any way.

Another and still further advantage is that a very high degree of ear protection results from the field application of the method of the invention which, in experiments has approximated from ninety to one hundred percent.

The following description, together with the accompanying drawing, will fully disclose this invention, and further advantages and objects will be apparent.

In the drawing:

Figure 1 is a plan view of an ear clip;

Figure 2 is an end elevational view thereof;

Figure 3 is an elevational view of the top part of a corn ear, with a part broken away to show the position of the fumigant tablet within the interior silk and the position of the ear clip in relation thereto.

Figure 4 is a cross-sectional view of Figure 3 along the line 4—4.

Figure 5 is a modified form of the ear clip.

Referring with more particularity to the drawing in which like numerals represent like parts, the ear clip is fabricated of a piece of wire, preferably crimping wire No. 16 gauge, and is of the general shape of a straight hair-pin with the two members 6 and 7 disposed in the same plane and of approximately equal length. A part of the end of one of the members, say the member 6, is bent at right angles to the plane of said members 6 and 7 to form a holding member 8, substantially as shown.

Referring with more particularity to Figure 3, the fumigant tablet 9 is disposed within the corn ear 10 just above the tip of the cob 11. The ear clip is positioned on the outside of the husk of the corn ear to encircle it a short distance above the said tablet 9 and the end of the member 6 is brought over toward the end of the member 7 and is hooked over the member 8, substantially as shown. The normal resilience of the sides of the clip compress the tip of the ear about which it is placed which effectively prevents the escape of the gas sublimating from the fumigant tablet 9.

In some instances where the corn ear is too bulky, the ordinary straight clip, as above described, may injure or break through the husk. Therefore, in such cases a modified form of the clip may be used, as shown in Figure 5 where the sides 12, 12 of the clip are bowed outwardly allowing a greater amount of material to be safely enveloped without compressing the husk so tightly. This form can be used in any case where it is desired to lessen the force of compression.

The fumigant tablet 9 is preferably composed of compressed hexachlorethane, which I have discovered to be a fumigant possessing insecticidal properties.

Having thus described my invention, I claim:

1. The method of fumigating growing corn against insects, which method comprises inserting within the internal silks of each ear of corn an insecticidal fumigant tablet, and thence sealing the ear above said tablet, whereby the gases from said tablet are forced to flow between the ear and the surrounding hucks.

2. The method of fumigating growing corn against insects, which method comprises inserting within the internal silks of each ear of corn a tablet of hexachlorethane, and thence removably sealing the ear above said tablet, whereby the gases from said tablet are forced to flow between the ear and the surrounding husks.

GEORGE W. BARBER.